US006174553B1

(12) United States Patent
Cerda et al.

(10) Patent No.: US 6,174,553 B1
(45) Date of Patent: *Jan. 16, 2001

(54) R-T-E CEREALS WITH CALCIUM CONTAINING PRE-SWEETENER COATING AND METHOD OF PREPARATION

(75) Inventors: Javier Cerda, Albuquerque, NM (US); James W Geoffrion, Anoka, MN (US); Daniel R Green, Minnetonka, MN (US); Tanya Sanders, Edina, MN (US); Donald J Smith, Eden Prairie, MN (US); Jonathan E. Trautz, Maple Grove, MN (US); Robert Wollenburg, Ramsey, MN (US)

(73) Assignee: General Mills, Inc., Minneapolis, MN (US)

(*) Notice: Under 35 U.S.C. 154(b), the term of this patent shall be extended for 0 days.

This patent is subject to a terminal disclaimer.

(21) Appl. No.: 09/503,953

(22) Filed: Feb. 14, 2000

Related U.S. Application Data

(63) Continuation-in-part of application No. 09/272,791, filed on Mar. 19, 1999.

(51) Int. Cl.⁷ ........................................................ A23L 1/29
(52) U.S. Cl. ................................ 426/96; 426/72; 426/74; 426/103; 426/302; 426/305; 426/618; 426/619; 426/620; 426/621; 426/648; 118/13
(58) Field of Search ................................... 426/72, 74, 96, 426/103, 302, 305, 618, 619, 620, 621, 648, 465; 118/13

(56) References Cited

U.S. PATENT DOCUMENTS

| | | |
|---|---|---|
| 1,163,175 | 12/1915 | Bullman . |
| 2,098,544 | 11/1937 | Hill . |
| 2,166,797 | 7/1939 | Collatz . |
| 2,239,543 | 4/1941 | Andrews et al. . |
| 2,600,532 | 6/1952 | Hale et al. . |
| 2,707,153 | 4/1955 | Bettman . |
| 2,743,685 | 5/1956 | Hale et al. . |
| 2,788,277 | 4/1957 | Huber . |
| 3,557,718 | 1/1971 | Chivers . |
| 3,565,559 | 2/1971 | Sato et al. . |
| 3,615,676 | 10/1971 | McKown et al. . |
| 3,620,762 | 11/1971 | Yoshida et al. . |
| 3,622,344 | 11/1971 | Allingham . |
| 3,726,693 | 4/1973 | Harris . |
| 3,764,343 | 10/1973 | Paugh . |
| 3,814,822 | 6/1974 | Henthorn et al. . |
| 3,878,305 | 4/1975 | Damico et al. . |
| 3,952,115 | 4/1976 | Damico et al. . |
| 4,079,151 | 3/1978 | Schade et al. . |
| 4,089,984 | 5/1978 | Gilbertson . |
| 4,338,339 | 7/1982 | Edwards . |
| 4,378,377 | 3/1983 | Gajewski . |
| 4,497,840 | 2/1985 | Gould et al. . |
| 4,540,587 | 9/1985 | Gajewski . |
| 4,614,657 | 9/1986 | Sheng et al. . |
| 4,702,925 | 10/1987 | Verrico . |
| 4,755,390 | 7/1988 | Calandro et al. . |
| 4,856,453 | 8/1989 | Verrico . |
| 4,857,339 | 8/1989 | Maselli et al. . |
| 4,859,477 | 8/1989 | Augustine et al. . |
| 4,880,645 | 11/1989 | Carpenter et al. . |
| 4,988,521 | 1/1991 | Fan . |
| 5,005,514 | 4/1991 | Verrico . |
| 5,023,024 | 6/1991 | Kyogoku et al. . |
| 5,093,146 | 3/1992 | Calandro et al. . |
| 5,258,187 | 11/1993 | Shimada . |
| 5,270,063 | 12/1993 | Wullschleger et al. . |
| 5,275,831 | 1/1994 | Smith et al. . |
| 5,306,519 | 4/1994 | Peterson et al. . |
| 5,449,523 | 9/1995 | Hansen et al. . |
| 5,510,130 | 4/1996 | Holtz et al. . |
| 5,516,541 | 5/1996 | Breslin et al. . |
| 5,631,034 | 5/1997 | Trumbetas et al. . |
| 5,645,878 | 7/1997 | Breslin et al. . |
| 5,695,805 | 12/1997 | Borek et al. . |
| 5,698,252 | 12/1997 | Kelly et al. . |
| 5,707,448 | 1/1998 | Cordera et al. . |
| 5,709,902 | 1/1998 | Bartolomei et al. . |
| 5,798,132 | 8/1998 | Chen et al. . |

FOREIGN PATENT DOCUMENTS 2079129   1/1982   (GB) .

*Primary Examiner*—Milton Cano
(74) *Attorney, Agent, or Firm*—John A. O'Toole; Douglas J. Taylor; Everett G. Diederiks, Jr.

(57) ABSTRACT

A method for coating discrete food pieces with a sweet coating such as in the preparation of a presweetened R-T-E cereal and coated food products prepared by the method is provided. The coating contains a mixture of sugars and calcium. The method of preparation comprises the steps, in sequence of: (A) providing a base of dried food pieces; (B) blending sugar syrup with an aqueous calcium slurry; (C) coating the base of dried food pieces with the sugar syrup and calcium slurry blend; and (D) drying the coated product to a shelf stable moisture content to provide a calcium fortified finished product.

42 Claims, 1 Drawing Sheet

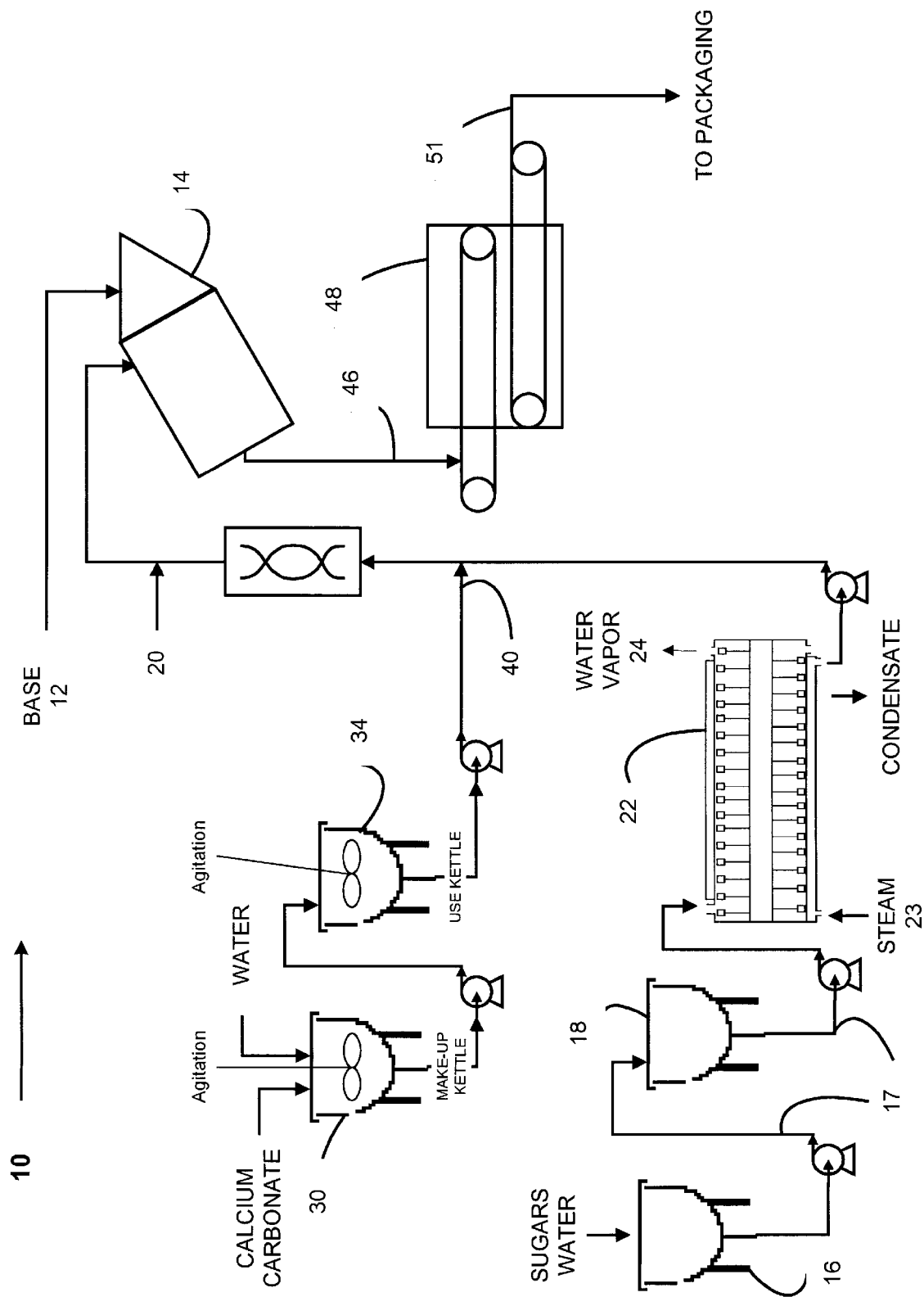

R-T-E CEREALS WITH CALCIUM CONTAINING PRE-SWEETENER COATING AND METHOD OF PREPARATION

CROSS REFERENCE TO RELATED APPLICATION

This patent application is a continuation-in-part application of commonly assigned U.S. application Ser. No. 09/272,791, filed on Mar. 19, 1999 and incorporated herein by reference.

BACKGROUND OF THE INVENTION

1. Field of the Invention

The present invention relates to food products and, more particularly, to presweetened ready-to-eat breakfast cereals. In its method aspect, the present invention relates to methods for the preparation of presweetened food products such as R-T-E cereals.

2. Description of the Prior Art

Cereal products, particularly R-T-E (hereinafter "R-T-E") breakfast cereals, are well-known and popular food items, particularly presweetened R-T-E cereals. Typically, such products include various coatings usually comprising nutritive carbohydrate sweeteners such as sucrose, corn syrup, fructose, etc. Also known are presweetened R-T-E cereals comprising coatings that include a high potency sweetener (See for example, U.S. Pat. No. 4,378,377, issued Mar. 29, 1983, entitled "Cereal Presweetened With Aspartame And Method Of Preparation", and U.S. Pat. No. 4,540,587, issued Sep. 10, 1985, entitled "Cereal Presweetened With Aspartame And Cold Water Soluble Gum Coating And Method Of Preparation", each to Gajewski).

Conventionally, presweetened breakfast cereals have been prepared by first producing unsweetened cereal pieces, particularly puffed cereal pieces; coating the cereal pieces with an aqueous slurry or solution of sweeteners; and then drying the coated pieces in an oven or air current to remove the added moisture.

The present invention provides further improvements upon those presweetened R-T-E cereal products and their methods of preparation that are described in U.S. application Ser. No. 09/272,791 entitled Presweetened Ready To Eat Cereals With Gelatin and Methods of Preparation" (filed Mar. 19, 1999 to D. Green et al. and incorporated herein by reference). In addition to gelatin, the topical coatings described therein optionally comprise a calcium material.

The present iapplication is directed towards providing presweetened coated R-T-E cereals that are calcium fortified at least in part by essentially including calcium into the sugar or presweeter coating and that optionally con comprise gelatin.

For adults, recent medical studies have indicated that a diet containing the U.S. recommended daily allowance (RDA) of calcium might be effective in preventing or mitigating osteoporosis, and also possibly high blood pressure and colon cancer. Calcium is of particular nutritional value in growing children to support bone growth. There is therefore great public interest in the consumption of food products that will supply the recommended daily allowance of calcium.

In view of the desire for introducing more calcium into diets, especially children's diets, it would be desirable if such R-T-E cereal products were fortified with supplemental calcium to provide a significantly nutritionally enhanced product. By significantly nutritionally enhanced is meant a product having at least 10% of the current recommended daily allowance ("RDA") or at least 100 mg of calcium per serving (typically 25 to 35 g of product) of R-T-E cereal.

Calcium can be added in limited amounts to R-T-E cereal products. R-T-E breakfast cereal products fabricated from cooked cereal doughs have long been fortified with various vitamins and minerals to supplement the native levels of calcium associated with the grain ingredients from which the products are prepared. See for example U.S. Pat. No. 2,166,797 (issued Jul. 18, 1939 to F. A. Collatz) entitled "Process of Fortifying Cereal Products with Minerals" and U.S. Pat. No. 2,239,543 (issued Apr. 22, 1941) entitled "Mineral Fortification of Foodstuffs" to Andrews et al., each of which are incorporated herein by reference. In each of these, a calcium source has been combined with a phosphate material. More recently and since at least 1985, certain corn and wheat flake R-T-E cereals have contained about 1% calcium from a calcium phosphate that provides about 200 mg calcium per ounce of cereal.

However, at higher levels of calcium fortification, the presence of such high amounts of calcium can adversely interfere with other desired product characteristics. For example, high levels of added calcium materials could negatively affect the taste, texture and density of the R-T-E cereal products. In particular, it is difficult to add calcium to cooked cereal dough that are to be made into puffed or expanded R-T-E cereals. Children's R-T-E cereals are disproportionately puffed R-T-E cereal products.

Calcium ingredients, and in particular, calcium carbonate, has been added as a leavening agent at low levels (e.g., about 0.1% to 0.3%) to cooked cereal doughs that are formed into puffed R-T-E products. If higher amounts of calcium carbonate are added such as to levels that are effective for calcium fortification, then the finished puffed cereal products do not readily form complex shapes such as are described in DES 339,443 or DES 339,444 each issued Sep. 11, 1993 and entitled "Food Product". Puffed products having such higher calcium levels tend to be misshaped and/or blow apart due to excessive leavening. Also, the cell structure can be adversely affected leading to deterioration in eating quality.

In view of the current interest in providing R-T-E cereals having high levels of calcium fortification, it would thus be desirable to provide R-T-E cereal products fabricated cooked cereal doughs fortified with supplemental calcium to provide a significantly nutritionally enhanced product.

SUMMARY OF THE INVENTION

The present invention relates to methods for the preparation of sweetened food products and to the products by such methods. The present invention is particularly suited for the preparation of R-T-E presweetened cereals.

In its product aspect, the present invention resides in comestibles or base, particularly R-T-E cereals, having a coating comprising calcium. The coating is present in a weight ratio of base to coating ranging from about 100:5 to about 100:150. Calcium is present in the coating at from about 0.5% to 5% of the coating.

In its method aspect, the present invention resides in methods of preparing calcium fortified topically coated dried food products. These methods essentially comprise in sequence the following steps. First, pieces of a dried food or cereal base are provided having a moisture content of less than about 5%. Thereafter, a pre-sweetener slurry that essentially includes calcium is prepared and topically applied to the base. The presweetener slurry contains sufficient amounts of calcium to provide a finished product having at least 100 mg of calcium per serving (typically 25 to 35 g of product) of R-T-E cereal. The weight ratio of food or cereal base to slurry mixture essentially ranges from 100:5 to about 100:150. The methods further include the step of drying the enrobed comestible to a final moisture content of less than about 5.0%.

In such calcium bearing typically presweetened food products, gelatin is an optional but not essential component of the topical coating.

DESCRIPTION OF THE DRAWINGS

The invention will be better understood by reference to the following drawings wherein:

FIG. 1 is a schematic process flow diagram of one preferred embodiment of the present method of preparation.

DETAILED DESCRIPTION OF THE INVENTION

The present invention relates to food products having a pre-sweetener coating essentially including calcium and to methods of their preparation. The present methods have particular utility in the provision of calcium fortified pre-sweetened R-T-E cereals. Reference is now made generally to FIG. 1, which shows a preferred embodiment of the present methods. Each of the preparation steps is described in detail below.

Throughout the specification and claims, percentages and ratios are by weight and temperatures given in degrees Fahrenheit, unless otherwise indicated.

A. Providing a Base of Dried Food Pieces

Referring now generally to the drawing, there is shown an embodiment of the present method of preparation generally designated by reference numeral 10. As there depicted, the present methods 10 of preparation essentially comprise the step of providing a base 12 of dried food pieces which can be charged or fed to an enrober. The food pieces could be of any food type which is desired to be provided with a sweetened coating and include, for example, puffed popcorn or other grains, nuts, candies, and the like. The present methods find particular utility in providing R-T-E cereals with a presweetened coating. In the following detailed description of the present invention, even though particular reference is made to a base comprising R-T-E cereals, it is understood that the present invention also finds wide application in provision of other food items wherein calcium fortification is desired.

The cereal pieces or base can be of any geometric configuration or form including, for example, flakes or puffs, shreds, biscuits, mini biscuits or the like. The present invention finds particular utility in the coating of puffed cereals. Such cereal particles are prepared in the usual manner and may be either toasted or untoasted.

Any conventional puffed cereal or method of preparation can be used herein to provide a puffed cereal base. The art is replete with such compositions and their methods of preparation and the skilled artisan will have no problem selecting suitable compositions or methods of preparation. Exemplary compositions and methods of puffed cereal preparation are found in, for example, U.S. Pat. Nos. 3,464,827, (issued Sep. 2, 1969 to T. Tsuchiya, et al.); 3,600,193, (issued Aug. 17, 1971 to E. F. Glabel, et al.); 3,246,990, (issued Apr. 19, 1966 to Thompson, et al.); and 3,687,687, (issued Aug. 29, 1972 to A. L. Liepa), each of which is incorporated herein by reference.

Particularly useful herein are smooth puffed pieces such as puff base or "O" or ring shaped pieces. Such pieces can be fabricated from cooked cereal doughs containing oats, corn (maize), wheat, rice, barley, and mixtures thereof and blends of such pieces. Minor cereal grains such as amaranth, triticale and the like are also known and can be used. The present invention finds particular suitability for use in connection with ring shaped puffed pieces fabricated from oat based cooked cereal doughs. The present application also finds particular suitability for use in connection with complexly shaped puffed pieces fabricated from corn based cooked cereal doughs. More particularly, the present invention finds suitability for those fruit flavored and nonflavored topically presweetened R-T-E cereal products sold under the Trix® and Kix® brand names.

Prior to application of the pre-sweetener coating, the base pieces themselves typically will have density ranging from about 0.15 to 0.5 g/cc, preferably about 0.2 to 0.3 g/cc. Due to the various shapes and their packing factors, the bulk densities of quantities of the base prior to coating will range from about 0.05 to 0.25 g/cc.

In certain variations, the base can comprise and be prepared from a cooked cereal dough having a little or no calcium content. For example, the cooked cereal base can comprise expanded pieces such as are prepared by direct expansion from an extruder. In certain particular variations, the expanded cereal pieces can being characterized as having a complex shape such as in those pieces depicted in Des 339,443 and 339,444. By complex shape is meant those shapes intended to resemble for example a shaped object such as a figurine, an animal, a vehicle, and a fruit. In certain variations, such cereal base pieces are not uniformly colored but rather are characterized by portions being of more than one color. For example, a pieces intended to be reminiscent of a raspberry can have one or more portions each of red or blue.

In certain variations, the cereal base can contain low levels calcium material for calcium fortification, e.g., up to about 0.005%–0.3% dry weight of calcium such as supplied by calcium carbonate, dicalcium phosphate and/or tricalcium phosphate. In particular, such cereal bases can also be puffed (i.e., having a density of 0.15 to 0.3 g/cc and weighing about 0.1 to 3 g). Such puffed cereal bases containing bases are conveniently in the form of simple to form shapes such as spheres, shreds, flakes, squares, biscuits, and mixtures thereof.

For those food products requiring low moisture contents, it is important that any drying operation is performed prior to the coating of the pre-sweetener coating. Typically, for example, puffed cereal bases must be dried to relatively low moisture contents in order to have the desired crispness or frangibility. Thus, when a puffed cereal is the food base in the present methods of preparation, it is preferable to dry the puffed cereal base pieces to a moisture content of less than about 4%, and preferably less than about 3%, prior to the application of the pre-sweetener coating.

Any conventional drying technique can be used to reduce the moisture content of the cereal base pieces. The drying can be accomplished using equipment such as a rotary bed, tray, or belt dryers. Simple hot air convection drying, e.g., 200° F. to 280° F. (93.3° C. to 137.8° C.), is the preferred technique for practicing the present cereal piece drying. Of course, in certain applications, e.g., the provision of puffed cooked cereal dough pieces by direct expansion from a cooker extruder, the moisture content may be of suitable range without the need for a separate drying step.

B. Coating With A Pre-Sweetener Coating

In the present method of preparation, the next step in sequence is to coat or to enrobe the dried cereal pieces 12 with a pre-sweetener coating slurry containing calcium 20. The slurry essentially comprises about 4 to 30% moisture, about 0.5–5% insoluble calcium and the balance nutritive carbohydrate sweeteners.

Conveniently, this step can involve the sub-steps of (1) providing a sugar syrup; (2) admixing an aqueous calcium dispersion to the sugar syrup to form a calcium containing presweetener coating blend; and, immediately thereafter, (3) applying the coating blend onto the cereal base.

(1) Providing A Sugar Syrup

The first substep can involve providing a sugar(s) syrup 25. The term "sugar syrup" is used in the art as a general collective term that includes both sugar syrups (i.e., no solids or oil components) as well as other compositions that include an oil component, whether or not emulsified, and/or solids. Generally, such sugar syrups comprise:

| Ingredient | Weight % | Preferred Range |
|---|---|---|
| Sucrose | 40 to 80% | 60 to 90% |
| Corn syrup | 0 to 30% | 10 to 20% |
| Oil | 0 to 25% | 0 to 5% |
| Moisture | 4 to 30% | 4 to 10% |

As illustrated, a first or make up kettle 16, can be used to prepare in batch fashion a sugar syrup.

Conveniently, this sugar syrup 17 is fed to a use kettle 18 that can supply a continuous stream of the sugar syrup 17 to a concentrator 22. The concentrator 22 is heated such as by steam 23 and in turn heats and concentrates the sugar syrup to by driving off water vapor 24 to provide a concentrated sugar syrup 25 of desired temperature, pressure and concentration. Also, the moisture concentration of the sugar syrup can be adjusted to anticipate the moisture added by the aqueous calcium slurry and/or other slurry additives to achieve desired moisture levels in the slurry upon application to the base.

In other variations, the provision of concentrated sugar syrup 25 can be practiced in a single vessel or in various equipment as desired.

It is generally undesirable to add the calcium material to the sugar syrup prior to concentrating or otherwise cooking the sugar syrup. Adding calcium carbonate to sugar coating before heating of the mixture resulted in a thick mixture (mucousy) which was white in color when the coated product was dried. However when a water/calcium carbonate mixture was added to the hot sugar coating just prior to sugar coating of the base cereal, it did not cause the sugar coating to be thick and was significantly less white in color.

The sugar syrup is generally applied to the cereal base at temperatures of about 95° C. to 125° C.

(2) Aqueous Calcium Slurry

The substep of admixing an aqueous dispersion or slurry of calcium 40 can involve preparing an aqueous calcium slurry or supply 28. Conveniently, for example, a first make up kettle 30 can be used to prepare in batch fashion the aqueous calcium which is fed into a calcium dispersion use kettle 34 to supply a continuous stream.

The aqueous dispersion can contain about 10 to 60% calcium, preferably about 40 to 60% calcium and for best results about 50% calcium and 50% water. The calcium slurry is agitated as needed to maintain a homogenous continuous supply. Constant agitation is preferred.

The aqueous calcium slurry can be added to the hot sugar syrup at any temperature. However, since little advantage is provided by a heated aqueous calcium slurry, the slurry is conveniently admixed with the hot sugar syrup at ambient temperature.

Useful herein to supply the desired calcium levels are calcium ingredients that supply at least 20% calcium. Especially useful herein are insoluble mineral calcium materials. For example, a good calcium ingredient herein is calcium carbonate in that calcium carbonate comprises about 40% calcium. While expensive, food grade calcium carbonate obtained by chemical reaction processes is desirable due to low levels of impurities. A good, inexpensive source of calcium carbonate from natural sources is ground limestone. Care should be exercised in selecting sources of ground limestone that are low in trace metals, especially such heavy metals such as lead. In particular, it is desirable that the ground limestone has total trace metal concentrations of less than 10 PPM. In particular, ground limestone having a particle size of less than 50 microns, preferably less than 12 microns is preferred for use herein.

Also useful herein are insoluble mineral calcium salts, particularly calcium phosphate salts. Such calcium phosphate salts provide high levels of calcium and are relatively inexpensive. Moreover, such calcium phosphate salts can be used to provide calcium at high fortification levels with an acceptable taste. Calcium phosphate is generally available as a monobasic ($CaH_4(PO4)_2 \cdot H_2O$), dibasic ($CaHPO_4 \cdot 2H_2O$) or tribasic ($Ca_3(PO_4)_2$) salts. Preferred for use herein is tricalcium phosphate, $Ca_3(PO_4)_2$, ("TCP") because of its high weight percentage of calcium (about 38%).

A variety of optional ingredients can be added to the pre-sweetener coating 20 containing calcium. Such optional ingredients can include flavors, colors, minerals, vitamins, preservatives, and supplemental high potency, oil, and mixtures thereof. If present, such ingredients can comprise about 0.1 to 15% of the coating composition. Heat tolerant high potency sweeteners can be used (e.g., acetylsulfame K). However, heat sensitive high potency sweeteners (e.g., aspartame) should not be used exclusively since the rigorous high temperatures of the subsequent drying step can cause degradation of these expensive high potency sweeteners. The vitamins selected should preferably be heat tolerant. A particularly useful combination of vitamins for topical application consist of vitamins C, A and D and mixtures thereof.

If a "frosted" appearance for the sugar coating is desired (as compared with a clear or glossy coating appearance), then manipulating the sugars content and crystal structure in known manner (i.e., adding crystalline sugar) can provide a frosted appearance. A frosted appearance can also be provided by adding, and in preferred embodiments, the coating composition additionally comprises, small amounts of titanium dioxide ($TiO_2$). Suitable $TiO_2$ concentrations range from about 0.02% to about 0.5% of the coating composition. Addition of a powdered white pigment is preferred to addition of a crystalline sugar or other sugar manipulation so as to provide not only a pleasing initial frosted appearance but also the benefits of resistance to dissolution in milk. Indeed, in highly preferred variations, addition of crystalline sugar to the enrober is avoided during the coating step.

In certain variations, the present coated products can include fruit flavors. For such products, the topical coating solution can optionally and preferably further comprise minor levels an edible organic flavor enhancer suitable for as the edible organic acid is ascorbic acid, malic acid, tartic acid, citric acid and mixtures thereof. Employment levels can be adjusted upwards to accommodate modest "neutralization" of the acidulant by the calcium ingredient. Useful collective levels of such acids can range from about 0.001 to 0.0025% (dry weight), preferably about 0.0012 to 0.0018%.

Any one or more of these coating supplemental ingredients can be conveniently added in the form of a third coating substream 35. For example, heat sensitive materials such as certain vitamins can be added in a third coating substream. If desired, the vitamin substream can additionally contain heat sensitive flavors, e.g. fruit flavors. The third substream 35 can also serve as a convenient technique for adding flavor acids such as malic, citric, or acid blends.

In addition to the nutritional benefits provided by employment of calcium materials, a supplemental appearance benefit is also provided especially for frosted coatings. Thus, rather than relying upon sugar crystal size and composition for imparting a frosted appearance, the appearance results from employing $TiO_2$ or calcium materials or both.

Good results are obtained when the present topical coating compositions comprise sufficient amounts of calcium ingredients to provide the total calcium content of the coated food base of at least 300 to 1500 mg per 100 g serving (dry basis) (i.e., about 0.3 to 1.5% by weight, dry basis) preferably about 0.3 to 0.5%.

In still other variations, a fiber can be added. Of particular interest is inulin in view of its bland flavor and solubility. In preferred variations, inulin is added in partial substitution for the sugars. If present, inulin can comprise from about 0.1 to 15% of the coating composition, preferably about 5 to 15%. Inulin is a particular fructo oligo saccharides. If desired, other fructo oligo saccharides ("FOS")can be used in full or partial substitution for inulin, especially short chain FOS ("scFOS"). The FOS materials can conveniently be added to the sugar syrup as either dried materials of as low moisture syrups. Gelatin can also be added to the coating.

(3) Applying The Coating Blend Onto The Cereal Base

The pre-sweetener coating-containing calcium 20 is then applied to the pieces of the cereal base to form a coated base 46. Desirably, the weight ratio of cereal base pre-sweetener coating containing calcium ranges from about 100:5 to 100:150, and preferably from about 100:30 to 100:120.

In the present process, the pre-sweetener coating containing calcium can be applied to the cereal pieces, for example, using an enrober drum or other coating vessel or equipment while the pre-sweetener coating containing calcium is at an elevated temperature and thus fluid. Since only small quantities of preferably room temperature calcium slurry 28, optionally vitamin blend 35, are added to the hot sugar syrup 25, the temperature of the pre-sweetener coating-containing calcium may be at a temperature of between about 200 to 300° F. (93.3 to 148.8° C.), preferably 212 to 300° F. (100 to 148.8° C.), and more preferably between 220 and 270° F. (104.5 to 132.2° C.).

The solution should preferably be introduced as a fine spray. Nozzles having the desired spray producing characteristics are commercially available and will not be described in detail.

Any conventional enrobing apparatus and technique can be used to practice the present enrobing or application step. Generally, a useful technique involves tumbling. The comestible piece(s) and aqueous suspension are each charged in any order to a rotating drum and tumbled for a sufficient time to achieve an even distribution of the suspension on the comestible. Preferably, the aqueous suspension is added after the comestible has been added to the drum. Another useful technique is simply spraying the aqueous solution over those comestibles, which are desirably not tumbled due to the shape, frangibility, etc.

In another variation (not shown), particulate matter can be added to the enrober for adhering the particulate matter to the external surface of the R-T-E cereal pieces. Particulate matter can include fruit pieces, granola, seed bits, candy bits, bran and mixtures thereof. The particulate material upon finish drying of the R-T-E cereal adheres to the external surface due to the coating action of the sugar slurry. Particulate matter can be added in a weight ratio of particulate matter to cereal base ranging from about 1:100 to about 25:100, preferably about 5:100 to about 15:100.

C. Drying

Desirably, the finished cereal base coated with the pre-sweetener coating is at moisture contents ranging from about 1% to 5% to provide shelf stable storage. Conventionally, the coated base 46 having been coated with a pre-sweetener coating is subjected to a drying step, and the present methods can comprise such drying step, in a drier 48 for times sufficient to reduce the moisture content to such desirable levels. The drying step functions to remove the moisture added with the pre-sweetener coating.

In certain embodiments, however, the pre-sweetener coating can be at sufficiently low moisture content (i.e., under 5% moisture) such that post coating application drying is minimal or even unnecessary.

The finished product 51 is characterized by a thin (i.e., about 20 to 40 microns in thickness) sugar coating containing calcium.

If desired, the dried R-T-E cereal pieces can be thereafter fortified with an exterior or topical application of heat sensitive vitamins. A vitamin(s) dispersion is topically added to the cereal base 51 such as by tumbling to form a vitamin fortified finished presweetened R-T-E cereal. Of course, the topical application of beta carotene is less preferred for the stability and appearance concerns discussed herein. Vitamin C beta carotene and other heat labile vitamins can optionally be sprayed onto the cereal pieces after the drying step 48.

After finish drying, the sugar coated pieces 51, optionally vitamin fortified, are allowed to cool to ambient temperature and then subsequently packaged and distributed in conventional manner. No further drying is required since the amount of added moisture from topical vitamin application is small.

What is claimed is:

1. A process for preparing a presweetened food product, comprising the steps of:
    (a) providing pieces of dried base;
    (b) coating the dried base pieces with a pre-sweetener coating comprising about 4 to 30% moisture, a calcium material in amounts sufficient to provide the coated pieces with a calcium content of at least 300 mg per 100 g dry weight, and, the balance nutritive carbohydrate sweeteners wherein the weight ratio of dried base pieces to coating ranges from about 100:5 to 100:150 to form the coated pieces; and
    (c) reducing the moisture content of the coated pieces to a range of less than 5%.

2. The process of claim 1 wherein at least a portion of the dried base includes a R-T-E cereal.

3. The process of claim 2 wherein at least a portion of the R-T-E dried base is a puffed cereal.

4. The process of claim 3 wherein step B comprises the sub-steps of:

(1) providing a sugar syrup;

(2) admixing an aqueous calcium slurry with the sugar syrup to form a coating; and immediately thereafter, (3) applying the coating onto the base.

5. The process of claim 4 wherein the aqueous calcium slurry comprises about 40 to 60% of the calcium material.

6. The process of claim 5 wherein the sugar syrup has a moisture content of about 4 to 30%.

7. The process of claim 5 wherein the calcium has an average particle size of less than 50 microns.

8. The process of claim 6 wherein at least the majority of the calcium material is calcium carbonate.

9. The process of claim 8 wherein the calcium material is ground limestone having a particle size of less than 12 microns.

10. The process of claim 8 wherein at least a portion of the calcium carbonate is provided by ground limestone.

11. The process of claim 4 wherein the sugar syrup has a moisture content of about 5% or less and wherein step (c) includes equilibrating the moisture content between the coating and the base without further drying.

12. The process of claim 2 wherein the R-T-E cereal base provides at least 0.005% calcium material.

13. The process of claim 2 wherein the R-T-E cereal base comprises puffed pieces prepared by the direct expansion from an extruder.

14. The process of claim 13 wherein the R-T-E cereal base comprises complex puffed pieces weighing about 0.1 to 3 g and having a density of about 0.15 to 0.3 g/cc.

15. The process of claim 14 wherein the R-T-E cereal base comprises complex puffed pieces fabricated from a corn containing cooked cereal dough.

16. The product prepared by the process of claim 1.

17. The product prepared by the process of claim 2.

18. The product prepared by the process of claim 3.

19. The product prepared by the process of claim 8.

20. A sweetened dry coated comestible, comprising:

from about 5 to 60% of the comestible of a coating, said coating including from about 0.5 to 5% of calcium and the balance nutritive carbohydrate sweeteners.

21. The comestible of claim 20 wherein the comestible is a R-T-E cereal base.

22. The comestible of claim 21 wherein the coating additionally comprises $TiO_2$.

23. The comestible of claim 21 wherein the R-T-E cereal base comprises puffed pieces prepared by the direct expansion from an extruder.

24. The comestible of claim 23 wherein the puffed pieces weigh about 0.1 to 3 g and having a density of about 0.15 to 0.3 g/cc.

25. The comestible of claim 24 wherein the coating additionally comprises a fruit flavoring.

26. The comestible of claim 24 wherein the puffed pieces have portions of different colors.

27. The comestible of claim 21 wherein the R-T-E cereal base comprises complex puffed pieces weighing about 0.1 to 3 g and having a density of about 0.15 to 0.3 g/cc.

28. The comestible of claim 20 wherein the coating comprises a calcium material in amounts sufficient to provide a calcium content of the comestible ranging from about 0.3 to 1.5% by weight, dry basis.

29. The comestible of claim 28 wherein at least a portion of the calcium material is calcium carbonate.

30. The comestible of claims 29 wherein the calcium carbonate has a total heavy metals content of 10 parts per million or less.

31. The comestible of claim 29 wherein the coating substantially coats the comestible.

32. The comestible of claim 29 wherein the coating additionally comprises a fruit flavor and an edible organic acid.

33. The comestible of claim 32 wherein the coating comprises about 0.001 to 0.0025% dry weight of an edible organic acid selected from the group consisting of ascorbic acid, malic acid, citric acid, tartic acid and mixtures thereof.

34. The comestible of claim 33 wherein the coating additionally comprises vitamins.

35. The comestible of claim 34 wherein at least a portion of the vitamins are heat sensitive.

36. The comestible of claim 28 wherein the calcium material is ground limestone having a particle size of less than 50 microns.

37. The comestible of claim 36 wherein the particle particle size is less than 12 microns.

38. The comestible of claim 11 wherein the coating has a thickness of less than 40 microns.

39. The comestible of claim 20 wherein the coating further comprises gelatin.

40. The sweetened dry comestible of claim 20 wherein the comestible has a calcium content of 0.3% or less.

41. The comestible of claim 20 wherein the nutritive carbohydrate sweeteners are substituted in whole or in part by an equivalent sweetness level of a high potency sweetener.

42. The comestible of claim 20 wherein the coating further comprises about 0.1 to 15% of a fructo oligo saccharide.

* * * * *